Oct. 19, 1954   O. BROWN   2,692,094
COMPOSITE AIRCRAFT
Filed Oct. 29, 1948   2 Sheets-Sheet 1

INVENTOR.

Oct. 19, 1954  O. BROWN  2,692,094
COMPOSITE AIRCRAFT
Filed Oct. 29, 1948  2 Sheets-Sheet 2

INVENTOR.

Patented Oct. 19, 1954

2,692,094

UNITED STATES PATENT OFFICE 2,692,094

COMPOSITE AIRCRAFT

Owen Brown, Los Angeles, Calif.

Application October 29, 1948, Serial No. 57,166

3 Claims. (Cl. 244—2)

Since the introduction, in 1912, of the pioneer aerial bombing technique—see Patent No. 1,032,394 to Admiral Bradley A. Fiske, U. S. N.—this method of attack from the air has undergone a series of major advances.

However, the one presently relied upon is believed still relatively primitive, as well as unnecessarily costly in terms of over-all financial outlay, in the loss of bombing craft to enemy counter-attack, and, hence, in the frequent loss of lives of the bombing personnel.

According to the existent system, long range bombing operations call for the use of large numbers of expensive superfortresses or the like, each designed to carry enough fuel and bombs to execute a complete mission over an air route—when necessary—of several thousand miles.

But notwithstanding some further development of plane-to-plane refueling techniques, the difficulty and expense of providing fighter escorts for such bombers over routes of travel quite outside the flying ranges of the lesser aircraft is most obvious. Parasite fighters, of the class heretofore constructed, afford but a make-shift solution of the problem.

Therefore bombers of the prevalent classes are particularly vulnerable (1) to attack from enemy intercepter planes, including so-called "kamikazes," and (2) to anti-aircraft fire. Their large sizes, moreover, serve but to greatly increase their vulnerability on both counts.

New bombers; new techniques

This invention, on the other hand, makes possible a mode of bombing wherein the bomb-relinquishing aircraft may fly for a brief but sufficient interval over the objective at an altitude well above anti-aircraft flak, and above successful attack from intercepter craft having only airstream types of motors.

Furthermore, bombers of this class are quite inexpensive to build, by comparison with superfortresses for example; they can be turned out much faster, under the pressure of military necessity; and they are relatively so much smaller and infinitely so much faster that they would be exceedingly hard to hit or to intercept.

It is well known that as aircraft begin to fly at transonic to supersonic speeds, ballistic problems are increased accordingly. But inasmuch as the types of bombers herein contemplated—and as distinguished from the relatively more primitive, slow-flying superfortresses—could not only be engineered to fly supersonic but, for brief durations, on rocket power exclusively, it follows that the likelihood of their interception becomes substantially nil.

Thus, even if rocket powered enemy aircraft were hastily sent aloft from ground level to intercept such bombers, it would be necessary for them, utilizing rapidly exhaustible fuel supplies, to first maneuver themselves into attacking positions while endeavoring to score hits upon the other very small aircraft traveling, perhaps, fast enough to materially discount the velocity and effect of the bullets fired at them. The difficulty of one supersonic airplane scoring a well placed hit upon another is well known to technicians of the art and need not be dilated upon here.

In practice, it would probably be quite futile to send intercepters up from ground level to stop large numbers of exceedingly small supersonic craft, which have all of the initial advantages of approaching the target from "airborne launching points" (to be explained) at great altitude; and from which points such planes become self-propelled at relatively high initial air-speeds. Unless the exact time of their intended arrival over the target were known by the enemy, to the split part of a minute, interception in such a manner appears practically impossible. Radar screens probably could not pick up such small objects, flying supersonic at great altitude, in time to be of much if any avail. Moreover, the aforesaid defensive plane-ramming—the "kamikaze" method—as advocated by some tacticians, would be no less difficult or impracticable for like obvious reasons.

It is not, however, altogether necessary for such bombers to fly at supersonic speeds or even up to the speed of sound, whether or not rocket-powered, for reasons which will be made clear in due course.

Primary distinguishments

It is one essential feature of my invention, and in contrast to the existing system, that the actual bombing aircraft (hereinafter conveniently designated as semi-bombers, or solo bombers) need have but relatively short flying ranges; and, when employed on long range operations, are first preferably towed to predetermined aerial launching points before having to expend any of their own fuel supplies.

This is not to say, however, that when it becomes practicable to construct supersize aircraft of the carrier type, "parasite" bombers per se based on such carriers may not be dispatched therefrom on short round trip raids; or the parasite bombers could launch from one carrier, execute a raid upon the objective, and thence quickly thereafter be received aboard a like carrier awaiting them on the opposite side of the target.

For near term applications, it is conveniently assumed that the semi-bomber of the drawings is towable. Such craft could be constructed to carry but a single bomb to be cast out from a special type of bomb bay formed in the respective semi-bombers, and thence preferably electronically "pin-pointed" on the target. However, see further suggestions hereinafter relative to torpedo type bombs.

The broader objects of the invention are by now self-evident; and these, along with more specific other objectives, will be further clarified and/or comprehended in due chronological order by a perusal of the subsequent description, the claims hereinafter, and the accompanying drawings, wherein—

Fig. 1 is the plan lay-out—according to at least one operating technique—of a long-ranging locomotive plane, towing a plurality of the releasable, self-propulsive semi-bombers.

Fig. 2, obviously side elevational, shows one of the semi-bombers of Fig. 1 in the act of guiding a remotely controllable bomb toward an objective, according to a well known technique.

Figure 3:
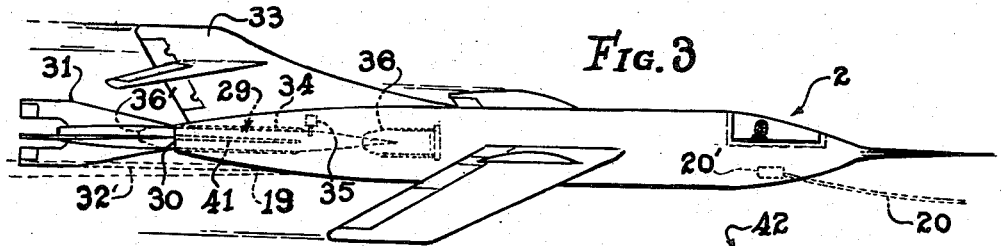
Fig. 3 shows a presently preferred type of ultra high-speed semi-bomber, having both airstream jet and liquid rocket motors, and, in this particular modification, means for discharging demolition bomb at supersonic speeds without unstabilizing the aircraft or upsetting the initial aerodynamic stability of the bomb when dropped.
Figure 6:
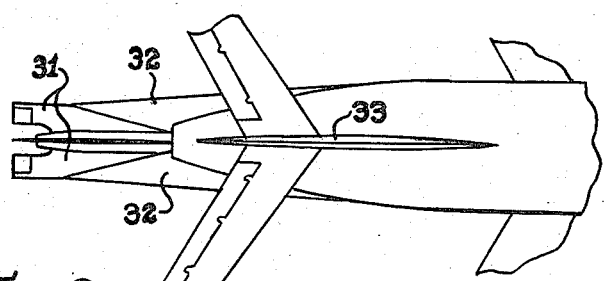

Fig. 6, looking down from above, shows the rear end of the semi-bomber of Fig. 3 modified, by option, to include right and left air-vanes for the avoidance of buffeting—as hereafter explained.

Figure 7:
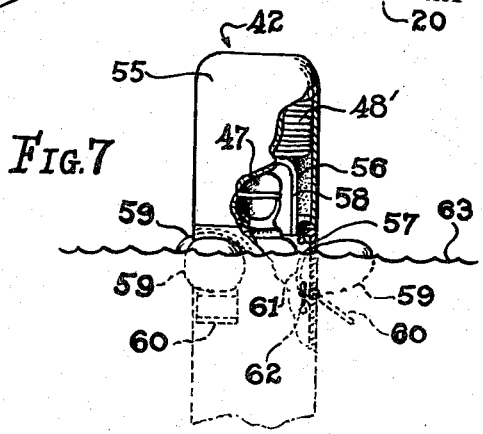
Figure 5:
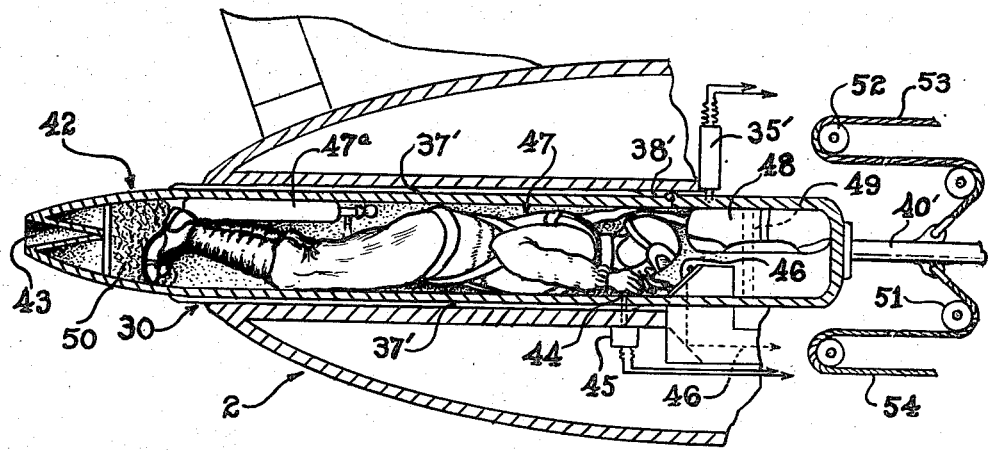
Fig. 5 illustrates, in broken open side elevation, a further development of the structure of Fig. 4, wherein said sham includes a pilot's escape capsule in combination with schematic means for ejecting it in the manner of the bomb of Fig. 3 as well as other means for operating certain instrumentalities from within the capsule.

And Fig. 7 is a broken open, elevational view of the escape capsule of Fig. 5, illustrating its utility for landings on water.

Only numerals, including auxiliary indicia, which relate to like structural features are employed throughout.

*One preferred arrangement*

Figure 1:
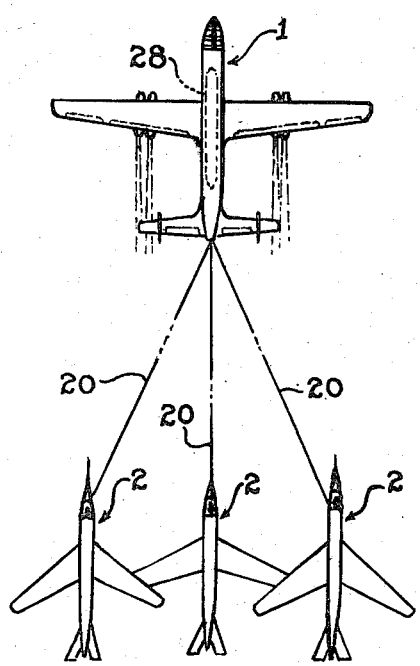

In Fig. 1 a large, long-ranging locomotive plane 1 is seen towing a triality of semi-bombers 2.

According to this version, the towed craft are each assumed to be in accord with the detailed view of Fig. 3.

While I do not graphically show such an installation, it may be found of advantage to provide each semi-bomber with a plurality of either or both types of the reaction motors utilized, having exhaust nozzles ducting to right and left of the longitudinal axis of the aircraft; or, in the case of turbojets, it would be readily possible to install a bifurcated exhaust, having a duality of tubes so ducting to atmosphere that the efflux 19 (Fig. 3) will by-pass the outboard portion of bomb 29 on both sides thereof.

Referring now to the aerodynamic characteristics of the semi-bombers, it is evident that craft 2 in the enlarged Fig. 3 view is a highly streamlined job. In most respects it may be likened to the Douglas D-558-2 Skyrocket, the general features of which are well known.

Semi-bomber 2 is designed for high-speed travel within the limits of airstream motors, as well as for brief rocket flight at substantially higher altitudes. The jet blast 19, therefore, may be regarded as the exhaust from a liquid fuel or other type of rocket motor; or, by option, from an airstream unit exemplified by turbojets.

Specifically, the Douglas D-558-2 is currently described as being powered by a combination which includes a Westinghouse J-34, also called 24C, and a multiple rocket unit built by Reaction Motors and presumably comparable to the rocket plant used in the Bell XS-1. It is engineered for speeds up to at least Mach 1, for launchings at ground level, and for self-sustained flight for approximately half an hour, of which two or three minutes thereof represent pure rocket thrust, but presumably for longer durations if the rocket component is employed intermittently.

Obviously, if such an aircraft is towed initially to an altitude of, say, 35,000 feet, and is thence released with full fuel and oxygen tanks, it could first climb somewhat higher and travel up to three or four hundred miles on turbojet power alone—higher still on the rocket fuel—enabling it to readily complete a bombing mission of the kind earlier foretold and be merely taken into tow again by a locomotive plane 1, utilizing auxiliary tackle means therefor such as set forth in my recently issued patent entitled Intercooperative System for Airborne and Surface Carriers, No. 2,639,107. By this reference it will be unnecessary to complicate the present drawings by incorporating such auxiliaries.

The tow-lines 20 in each of Figs. 1 and 3 are self-explanatory. Phantom 20' indicates a cable-release mechanism.

Air trains comprising locomotives 1 and the semi-bombers can be launched in a conventional manner, including the use of jet-assisted take-offs, or, wherein the facilities therefor are available, by so-called "electropults" or comparable devices of the prior art.

Assuming that the semi-bombers have arrived at a predesignated area on the approach to an objective to be bombed, each of the crafts 2 can now be released successively for self-propulsive flight. Speeding thence along the altitude line 21 of Fig. 2 until nearing the general area of target 22 (line 21 being below the ceiling of airstream motors), each of the semi-bombers can now change over from turbojets to rocket motors, rising rapidly to the altitude level of line 23, which is presumably the predetermined height from which each flyable bomb is to be cast off. The general technique is further indicated by semi-bomber 2, which in Fig. 2 has already released the guidable bomb 6, and said bomb is executing a supersonic dive on the target along the dotted line 24.

According to an elected one of sundry preferred techniques which have been developed for remotely, guidably controlling so-called robots and the like, and now well known to the art, bomb 6 is being directed automatically toward the target 22. One such method, for instance, is disclosed by Alda V. Bedford in Patent No. 2,404,942, applicable to bombs of the type which are dropped through conventional bomb bays, but which could be utilized with self-propulsive bomb 6 as well.

According to this method the pilot or other operative on plane 2 maintains an optical (or other) sighting on the target 22 along the moving line 25 while pulses of radiant energy are generated from the semi-bomber and picked up at bomb 6, from along the moving line 26, hypothetically. Said energy is computed, by instrumentation therefor on the bomb in coaction with its autopilot group, to actuate the control surfaces of craft 6. And by continuing to maintain the sighting line 25 and varying the angle between this line and line 26, the bomb 6 is trolleyed to a pinpoint hit on the target 22. That is, unless detonated prior thereto by a proximity fuse. See said patent for full details.

The foregoing technique, of course, may be varied in any professionally desired manner; among the known alternative possibilities being automatic radar tracking, thermal, acoustic, televisory and photo-electric homing devices. And while the perfection operationally of the longer-ranging guided missiles, when employed for "interception," seems unlikely in the near future, it is believed that one or more of the available types could be utilized now, and with great accuracy according to the "offensive" system here taught, since they would be launched from airborne positions, usually, above the immediate area of relatively large targets; that is, targets which—in the case of stationary ground objectives—do not have relative, independent movements.

Parenthetically, however, it does not follow that the exact techniques which are mainly featured herein will always be preferred; it being obvious that under different circumstances the ground target 22 could be a waterborne aircraft carrier. In that event, the methods set forth in said first named patent to Admiral Fiske, but according to any desired modification of the same, could be employed. Again, if target 22 happened to be an enemy bomber of the superfortress class, the advantage of being able to launch an attack with one or more target-seeking missiles comparable to bombs 6 or 29—the latter to be described—from an altitude thereabove or from any preferred other point of vantage will be readily appreciated.

Ejecting the bombs

Referring to the more detailed drawings—Figs. 3 to 6 inclusive—my proposed new bombing technique will now be more fully amplified; that is, whereby the semi-bomber may readily fly at transonic to supersonic speeds over objective 22 and discharge a bomb 29 without unstabilizing either the relatively small aircraft 2 itself or the missile dropped.

As intimated earlier, inferentially, the act of dropping a conventional type of bomb through the bay doors of a subsonic B-29 or the like, with the aid of a bomb sight, and discharging the same missile from a transonic or supersonic aircraft are not operationally comparable. To even travel at ultra high speeds, the aircraft must present a finely balanced ensemble of cooperative components, and the slightest maladjustment of one of these might result disastrously for both plane and pilot. Thus to the known difficulties of firing bullets from such airplanes, with any degree of accuracy unless at head-on trajectories, is added the problem of separating so large an object as a demolition bomb from its carrier against the battering action of a transonic or supersonic slipstream.

I propose, however, to accomplish such a relinquishment under any predetermined speed requirement, and without so much as necessitating trim changes of the aircraft except optionally. This I propose to do by the complete avoidance of launching the bomb through the boundary layer of the semi-bomber: in short, by launching it within the pattern of the slipstream itself after leaving the aircraft. Being formed, also, for supersonic flight, and preferably self-propelled, it is clearly possible to so design such bombs that they can be cast off without tumbling end-over-end or gyrating in such a manner as to spoil their trajectories.

In Fig. 3, semi-bomber 2 introduces a new type of bomb-bay 30, at the tail end of the aircraft. Protruding therethrough is the rearward end of the single bomb 29, the vanes 31 of which are all outboard. Obviously, these vanes are of such configuration as to present an hypothetical minimum of resistance to the downstream air.

If, however, any slight compressibility difficulty should be experienced because of their location rearwardly of the wings, instead of well above the wings in the case of the horizontal stabilizers, the difficulty could be remedied by the provision of the right and left air-vanes or guards 32 and 32 of Fig. 6, which guards, as therein viewed from above, complete a tapered pattern beginning at respective sides of the fuselage and extending backward therefrom to flush abutments with the right and left horizontal stabilizers vanes 31 of the bomb. The outer edges of these vanes 32 are quite sharp for slicing through hard air and their flat contours, upper and lower, insure a smooth laminar flow of the boundary air thereover and thereunder— and thence over and under fins 31—without turbulence or buffeting.

It is not felt that the air gap between the fin 33 and the uppermost of the vanes 31 will be such as to require a similar correction, or a comparable, hypothetical guard member 32' therebelow, as optionally provided in Fig. 3.

Without unduly complicating the drawings, it is conveniently indicated that, upon suitable actuation, the bomb 29 can be quickly discharged to the rear while maintaining its position relative to the control surfaces of the semi-bomber, as by means of any desirable plurality of splines 34 (here shown only in upper and lower locations). These splines, of course, engage suitably conformed longitudinal slots, and the schematic solenoid 35, having a pin therebelow to engage a recess in the bomb casing, merely indicates a means for maintaining the bomb 29 in the position shown, subject to its instantaneous release when elected.

Any pneumatic or desirable other device may be employed for forcibly ejecting the bomb, upon its release by the latching means; but as the thus exposed and gaping bomb-bay 30 would, if left open, create a turbulent wake, a sham tail-piece 36 is adapted to instantaneously replace the discharged bomb, as is seen in its subsequent position 36' closing the bomb bay.

The sham 36 has a sharply tapered conical recess within which the tip end of the bomb 29 nests, approximately as indicated; and if said tip has a detonator which is at all likely to be set off by the ram action of the sham, when moved rearwardly, suitable correction therefor can be made at the respective areas of engagement therebetween.

Figure 4:
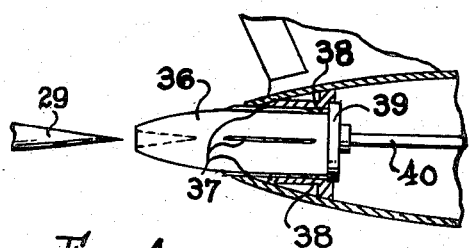
Fig. 4 is a fragmental side-elevation of the tail end of the aircraft of Fig. 3, broken open to show how a sham tailpiece can be operated to instantaneously replace the outboard portion of a bomb, when cast off toward a target.

Fig. 4 shows the bomb 29 a brief instant after its discharge from sham 36, which follows it rearwardly until the opening theretofore occupied by the bomb becomes completely and automatically filled by said sham. To facilitate this action, sham 36 also has a plurality of splines 37 for like engagements with slotways 38 until the sham is stopped, as by means of collar 39, for example. The headed piston rod 40 is also to be viewed schematically and indicates any preferred means for quickly thrusting the sham rearwardly while simultaneously pushing out the bomb 29 with the aid of the slipstream.

Needless to say, the sham 36, inclusive of vanes 37 and slotways 38, may be as long as necessary for the accommodation of both the tail-piece and the bomb in their respective relations.

Figure 2:
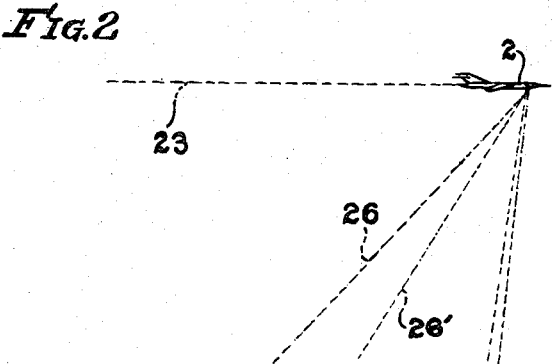

The combination of Fig. 3 is especially designed for bombs of the droppable type; but I do not wish to so limit the same, unnecessarily, since it may be found both practicable and desirable—as already explained in brief relative to Fig. 2—to employ flyable aerodynes comparable to bomb 6. This may be done by providing suitably conformed right and left wing-slots 41, through which extendable or even rigid, non-extendable wings could protrude. The wing-slots could be automatically closed by complementary, spline-like members on the right and left sides of sham 36, whereby to prevent the entry of outside air.

And it is further conceivable that much larger airplanes, having openings similar to door 30, could both relinquish and receive visiting small aircraft therethrough when traveling at relatively low speeds.

*Other options*

Alternatively, should it be desired to eliminate all such projecting members as the vanes 31, whereby to afford a fully cleanly streamlined exterior to the semi-bomber, the bomb 29 could be of the spinner type. Furthermore, as so-called "spinner rockets" are much shorter than those of the fin-stabilized type, and need not be merely singly loaded through bay 30 from outside the plane, it would be possible to discharge a plurality thereof during a single bombing mission: one bomb being fitted behind another from the aircraft interior. Thus each succeeding spinner bomb could automatically expel the one preceding it in general accord with the method already explained with regard to bomb 29 and sham 36. Optional torpedo type bombs will be dealt with later.

According to either of the options given relative to Fig. 3, the semi-bomber 2 could be received, after each flight, aboard a locomotive 1 or other aircraft having the upper hatch 28; in which only partially inboard position it could be reloaded and refueled for a return trip over the target area. The actual dropping of the bombs could be in accord with standard practices, the precise technique being varied according to the type and aerodynamic characteristics of the bombs employed. In the case of a bomb 29, for example, it could be jettisoned and remote-controlled in the manner set forth in the aforesaid patent to Alda V. Bedford; being, in that case, the same as missile 24ᵃ in Fig. 2.

In brief, the bomb 24ᵃ (or bomb 29) would be air launched normally and thereafter guided toward the target by maintaining and varying the angle of the sighting-line 25′ relative to the line 26′, which represents the electronic line of control between plane 2—in this view—and said bomb. It is believed that properly designed bombs, when fitted with auxiliary rocket boosters and discharged according to the technique herein explained, will not be unstabilized as would those ejected through the boundary layer of the aircraft; that they would leave the semi-bomber in fully stabilized positions, and, when sufficiently aft of the actual slipstream of the semi-bomber, would go into a normal supersonic dive without oscillatory or end-over movements. Normal trajectories could be maintained by merely powering each bomb according to the anticipated speed of the semi-bomber.

Other corrective adjustments, including modifications in probability tables, bomb-sight instrumentation and the like, are but matters of orthodox engineering and may be readily conformed to the structures and over-all techniques disclosed.

Inasmuch as a substantial displacement of weight will occur with each bomb dropping, it may be necessary, on craft as small as semi-bomber 2, to provide means for automatic correction of this possible difficulty. This particular feature, however, will be clarified shortly with reference to Fig. 5.

*The escape capsule*

It is of prime importance, in case of emergency, that a means for the escape of the pilot shall be provided in these ultra high-speed aircraft, such as plane 2. But while various contrivances therefor have been advanced—such as mechanisms for catapulting the entire pilot's pressurized cockpit clear of the remainder of the airplane, with provision for his final descent by parachute—such devices are inherently deficient in one particular or another.

Typical among the proposed escape devices is one designed for incorporation in so-called "suicide" or "kamikaze" planes, in the form of a capsule within which the pilot is ensconced until, having aimed his craft to crash into an enemy bomber, he operates an ejector button which projects said capsule clear of the aircraft a brief instant prior to the intended impact.

Unhappily, however, it seems extremely difficult if not impossible to successfully accomplish such ejections, through the hard boundary layer air, while automatically creating areas of excessive turbulence tending to deflect the prior aim of the ramming aircraft; or, indeed, without actually superinducing such a deflection. For obviously any material unstabilization of an airplane in areas of high compressibility might be sufficient to throw it entirely out of control and at the mercy of violent shock waves.

According to Fig. 5, such a hazard is effectually eliminated, in apparently the only aerodynamically practicable manner. In short, whether employed in structure with ramming aircraft or merely as means of escape from semi-bombers 2 and the like, the capsule 42 is designed for ejection in much the same manner as the bomb 29, through bay 30. In fact, in this version, it is provided with the conical cup 43 within which the nose of a bomb 29, for example, could be received. Then, when the bomb is to be ejected, the capsule could automatically replace it in lieu of sham 36; and, in turn, be itself ejected by any satisfactory mechanism therefor and here suggestively indicated by the headed piston rod 40′.

Splines 37', upper and lower, and slotways 38' are comparable to elements 37 and 38 of Fig. 4 and are self-explanatory. Solenoid 35', as in the case of element 35 of Fig. 3, indicates a means for locking the capsule until its release, electively, by operation of an ejector button 44 connecting to switch 45, and the latter suitably wired therefor. The panel 46 indicates means by which the pilot 47 can continue operating push-button aircraft controls up to the instant of ejection of the capsule. Briefly, for this purpose, a multiple plug assembly (not shown) such as so-called cannon plugs for example, could be utilized; so that all connections would be broken automatically upon actuation of the ejector button.

Centered in the panel 46 could be an optical element, such as a bomb sight, periscope or other means for performing visual computations. In this view, the arrow-line 46 indicates a periscopic sighting from within the capsule, the window therefor being either in a forwardly disposed location or elsewhere according to the function contemplated. Oxygen bottle 47ª merely symbolizes a pressurization and air-conditioning means, and the conveniently placed parachute pack 48 is for later use in making a final escape from capsule 42.

Other accessories

However, a capsule of this type makes possible the use, by option, of a special 'chute, which could be of the ribbon type, adapted to be compactly contained in the area generally indicated as being to the right of the phantom partition 49. At a given time following ejection of the capsule from plane 2, the entire top of capsule 42 could be exploded off or otherwise jettisoned, the capsule 'chute opening out automatically, as will be further explained relative to Fig. 7. Pilot 47 could, if elected, remain inside the capsule throughout all or most of the period of his descent, the walls of same serving as a protective armor against machine gun bullets or anti-aircraft flak. If the pilot remained inside the capsule until it grounded, some obvious form of shock-damping device could be disposed in the position of the foot-cushion 50.

Such a capsule, moreover, could be utilized as a marine life-preserver whenever ejections are necessary over large bodies of water. The more detailed view of Fig. 7 shows how the top 55 could be jettisoned any time after the occupant 47 had dropped to the proper altitude, whereby to release the parachute 48' from cell 56, as by manually turning the lock-bolt 57. Thereafter occupant 47 will be afforded a clear view through the inner top member 58, which could be of Plexiglas or the like. When rescued, member 58 can also be readily removed. The lower shroud lines of parachute 48' can be securely anchored to the lower inner casing wall in any professionally preferred manner.

In order to insure adequate buoyancy and to make sure that the capsule will float right-side-up, a triality of inflatable water-wings 59 are adapted to protrude as indicated through small ports in the casing wall; as see closures 60 and inner blisters 61 defining pockets wherein the wings 59 were previously idly disposed. Element 62 indicates a headed screwpin or the like for puncturing a miniature gas capsule, whereby pressurized gas is released into each of the wings 59.

In lieu of element 57, and since the occupant might be unable to accurately estimate the proper moment to release the cover 55 and parachute 48', it may be expedient to provide an automatic barometrically operated release mechanism; which same need not be graphically shown since well known in other divisions of the aeronautical art.

Obviously, escape capsules of this type would additionally afford protection from sharks in tropical waters, and from exposure to excessive cold in more northerly seas. Similar capsules could be used in lieu of conventional marine life-preservers.

It is understood that the 'chute 48' could be jettisoned after capsule 42 strikes the water-line 63. Flares and/or other signalling means are optional.

Any other arrangements with regard to capsule 42 and its auxiliaries can, now and hereafter, be readily provided by operatives in this branch of the related art.

As was mentioned in relation to bomb 29, it is desirable to provide automatic means whereby to compensate for the weight displacement caused by ejection of capsule 42; and such a means is shown schematically by the plurality of forward and rearward pulleys 51 and 52, over which are trained the cables 53 and 54 leading to suitable weight-compensating elements to be moved automatically and progressively as the capsule (or bomb) is pushed rearwardly. The weight compensators could be movable fuel containers—or any preferred other option may be carried out.

One further variant, as indicated earlier, could be provided in the form of a suitable cable-release mechanism (not shown) on bombs of the flyable type, such as were mentioned in respect to the right and left wing-slots 41 of Fig. 3; thus enabling such bombs (or other burdens, including inhabited aircraft on sufficiently large airplanes) to be expelled initially at one end of a tow-line. According to such a possible technique, the flyable bomb or its equivalent could be payed out and maintained as a tow-burden until fully stabilized above or below the wash of craft 2, or until a final, accurate sighting on the target 22 had been obtained.

Moreover, in addition to the versions previously referred to, bomb 29 could be of a type comparable to marine torpedoes, having stabilizing fins within the diameter of the maximum diameter of the casings; and whereby a plurality of the same could be expelled in a manner comparable to the release of similar missiles through submarine torpedo tubes.

Aerial bombs of the latter general type, with suitably tapered tail ends, would make it possible to provide, say, upper and lower clam-shell closures for the port or bay 30, which would automatically restore the streamlined effect seen at phantom 36' upon release of each bomb. But, prior to such releases, each of the clam-shell members could press closely against the tapered rear ends of the bombs in form-fitting relations; narrow slots being provided for the protrusion of the abbreviated stabilizer fins therethrough.

While I have disclosed a plurality of embodiments by way of illustrating the invention, it is obvious that the latter is subject to various substitutions and variations within the general scope of my concept. The drawings, therefore, are not necessarily features of limitation except as may be hereinafter qualified by the allowable claims.

I now claim:

1. In cooperative structure: an aircraft having wall means defining an opening therein, an object to be pushed out through said opening from a prior position thereof at least partially within the aircraft interior, and a second object within said craft characterized as a sham device which follows said first object only partially outwardly through said opening while continuously maintaining the closure thereof—incidental to the expulsion of said object—in form-fitting relation to said wall means at the area thereof contiguous said opening; said sham being provided with means for enabling it to be positively, retrievably, intercepted and stopped against any further or subsequent outward movement of the same, at a location where it effectually serves as an air-lock to prevent the admission of atmospheric outer air through said opening into the interior of the aircraft.

2. In combination: an aircraft having an opening formed in the tail end portion thereof, said opening facing outwardly substantially opposite to the flight direction of said craft; a first object to be released to atmosphere through the confines of said opening; and a second object, which follows behind said first object in an air-sealing relation to said opening to a partially outboard position; the protruded, outboard portion of said second named object, while thus normally stationarily disposed, comprising a temporary sham extension of the tail section of said craft and contributing thereto a modification of the streamlined configuration thereof such as to substantially minimize the amount of wake turbulence which would otherwise occur at the proximity of said opening.

3. In combination: an aircraft having an opening at its extreme rear end portion, and a lesser aerodyne carried thereaboard to be normally relinquished therefrom—and substantially coaxial with the longitudinal axis of said first aircraft—by way of said opening; said lesser aerodyne being provided with means, including a jet motor of the thermal reaction class, for its self-propulsion upon its release from said first named craft.

References Cited in the file of this patent

UNITED STATES PATENTS

| Number | Name | Date |
|---|---|---|
| 1,603,688 | Hall | Oct. 19, 1926 |
| 1,621,654 | Boos | Mar. 22, 1927 |
| 1,721,039 | Risher | July 26, 1929 |
| 1,873,505 | Stipa | Aug. 23, 1932 |
| 1,933,187 | Saeder | Oct. 31, 1933 |
| 2,314,881 | Helmick | Mar. 30, 1943 |
| 2,339,011 | Gurney | Jan. 11, 1944 |
| 2,345,616 | Manson et al. | Apr. 4, 1944 |
| 2,364,598 | Beddow | Dec. 12, 1944 |
| 2,364,803 | Mayhew | Dec. 12, 1944 |
| 2,381,332 | Boldt | Aug. 7, 1945 |
| 2,389,160 | Manson et al. | Nov. 20, 1945 |
| 2,399,215 | Fahrney | Apr. 30, 1946 |
| 2,399,216 | Fahrney | Apr. 30, 1946 |
| 2,418,702 | Du Pont | Apr. 8, 1947 |
| 2,422,662 | Fahrney | June 24, 1947 |
| 2,440,295 | Synnestvedt | Apr. 27, 1948 |
| 2,463,352 | Broluska | Mar. 1, 1949 |
| 2,467,045 | Lobelle | Apr. 12, 1949 |
| 2,468,559 | Kangas | Apr. 26, 1949 |
| 2,479,746 | L'Anson | Aug. 23, 1949 |
| 2,514,513 | Price | July 11, 1950 |
| 2,585,030 | Nosker | Feb. 12, 1952 |

OTHER REFERENCES

"Aviation News," page 11 of November 11, 1946.